(12) United States Patent
Ok

(10) Patent No.: US 6,850,507 B1
(45) Date of Patent: Feb. 1, 2005

(54) APPARATUS AND METHOD FOR ACQUIRING PN SEQUENCE IN MULTICARRIER CDMA MOBILE COMMUNICATION SYSTEM

(75) Inventor: Kwang-Man Ok, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/570,845

(22) Filed: May 12, 2000

(30) Foreign Application Priority Data

May 12, 1999 (KR) ........................................ 1999-17016

(51) Int. Cl.[7] .......................... H04J 13/02; H04B 7/216
(52) U.S. Cl. ...................... 370/335; 370/342; 375/142; 375/150; 375/367
(58) Field of Search ................................ 370/203, 206, 370/207, 208, 209, 335, 342, 503, 515, 350; 375/130, 140, 141, 142, 147, 150, 316, 329, 362, 367, 137, 143, 149, 152, 148, 144; 455/130, 132, 137, 138, 139, 507, 509, 517

(56) References Cited

U.S. PATENT DOCUMENTS

| | | | | |
|---|---|---|---|---|
| 5,577,025 A | * | 11/1996 | Skinner et al. | 370/209 |
| 5,590,160 A | * | 12/1996 | Ostman | 375/367 |
| 5,644,591 A | * | 7/1997 | Sutton | 375/142 |
| 5,790,589 A | * | 8/1998 | Hutchison et al. | 375/149 |
| 5,799,010 A | * | 8/1998 | Lomp et al. | 370/335 |
| 5,870,378 A | * | 2/1999 | Huang et al. | 370/209 |
| 5,910,964 A | * | 6/1999 | Sugita | 375/130 |
| 5,926,503 A | * | 7/1999 | Kelton et al. | 375/148 |
| 6,285,655 B1 | * | 9/2001 | Lundby et al. | 370/209 |
| 6,385,180 B1 | * | 5/2002 | Maru | 370/335 |
| 6,389,058 B1 | * | 5/2002 | Lee et al. | 375/141 |
| 6,717,976 B1 | * | 4/2004 | Shen | 375/147 |

* cited by examiner

Primary Examiner—Alpus H. Hsu
(74) Attorney, Agent, or Firm—Dilworth & Barrese LLP

(57) ABSTRACT

A PN sequence acquisition device for a multicarrier CDMA mobile communication system including M (where M is a natural number) despreaders, each for multiplying BS generated PN sequences included in M carrier receiving signals by a local PN sequence of an nth ($1 \leq n \leq N$, where n and N are natural numbers) time hypothesis in a predetermined integrating period; M correlators, each corresponding to a corresponding one of the M despreaders and each for calculating detection energies depending on correlations between the BS generated PN sequences of the corresponding one of M carrier receiving signals and the local PN sequence of the nth time hypothesis; a combiner for combining the detection energies corresponding to the local PN sequence of the nth time hypothesis for the M carrier receiving carriers; a controller for comparing the combined detection energy of the M carrier receiving signals, output from the combiner, with a threshold value; and N acquisition circuits including an nth local PN generator for providing the local PN sequence of the nth time hypothesis to the M despreaders and shifting a phase of the local PN sequence of the nth time hypothesis by a predetermined value under the control of the controller, whereby PN sequence acquisition is simultaneously performed on N time hypotheses.

8 Claims, 3 Drawing Sheets

APPARATUS AND METHOD FOR ACQUIRING PN SEQUENCE IN MULTICARRIER CDMA MOBILE COMMUNICATION SYSTEM

PRIORITY

This application claims priority to an application entitled "Apparatus and Method for Acquiring PN Sequence in Multicarrier CDMA Mobile Communication System" filed in the Korean Industrial Property Office on May 12, 1999 and assigned Serial No. 99-17016, the contents of which are hereby incorporated by reference.

BACKGROUND OF THE INVENTION

1. Field of the Invention

The present invention relates generally to a mobile station in a CDMA (Code Division Multiple Access) communication system, and in particular, to a device and method for acquiring a PN (Pseudo Noise) sequence in a mobile station.

2. Description of the Related Art

In a spread spectrum communication system, a transmitter spreads an information signal over a wide bandwidth and a receiver then despreads the spread signal to the original bandwidth. Spread spectrum techniques are generally classified into direct sequence techniques, frequency hopping techniques, time hopping techniques and hybrid techniques. A commercial CDMA system typically employs the direct sequence spread spectrum (DSSS) technique. That is, in the CDMA system, a base station (BS) multiplies an information signal by a PN sequence having a high data rate to spread the information signal before transmission, and a mobile station (MS) then multiplies a received signal by the same PN sequence as that generated in the base station to despread the received signal, thereby recovering the original information signal. To accomplish this, the mobile station performs sync acquisition to synchronize the phase of the PN sequence generated in the base station (hereinafter referred to as BS generated PN sequence) with the phase of the PN sequence generated locally in the mobile station.

In CDMA mobile communication systems, the sync acquisition of the mobile station can be divided into two operations, namely acquisition and tracking. The acquisition operation is used to acquire synchronization for the BS generated PN sequence within a threshold value, and can be further divided into two operations. First, the mobile station calculates detected energy depending on a correlation between the received BS generated PN sequence and the locally generated PN sequence, and second, the mobile station compares the calculated results with a threshold value. If the calculated result is less than the threshold value, the mobile station shifts the phase of the locally generated PN sequence and then calculates the detected energy for the new sequence. Otherwise, when the calculated result is higher than the threshold value, a starting point of the locally generated PN sequence will fall within a predetermined critical error, range and the mobile station performs fine synchronization by finely comparing the calculation result of the detected energy with the threshold value. That is, the mobile station performs the tracking operation.

Several algorithms have been proposed for performing the tracking operation. The algorithms may be classified into several methods. One such method involves adjustment of an integrating period. Further, the acquisition operation can be divided into a serial search method and a parallel search method.

FIG. 1 illustrates a serial acquisition circuit for using the serial search method in a mobile station in a CDMA mobile communication system.

Referring to FIG. 1, a multiplier 110 multiplies an input BS generated PN sequence value by a local PN sequence value generated from a local PN sequence generator 120 in a predetermined integrating period. The multiplier 110 provides the multiplication results to a correlator 130. The correlator 130 calculates detection energy depending on a correlation between the two PN sequence values. A controller 140 compares the detection energy with a threshold value. If the detection energy is less than the threshold value, the controller 140 provides a phase shift control signal to the local PN sequence generator 120 to shift a phase of the local PN sequence. As a result, the mobile station repeats the detection energy calculating operation and the comparing operation. Otherwise, when the detection energy is greater than the threshold value, the controller 140 determines that acquisition has been successfully performed. Thereafter, the mobile station performs the tracking operation.

Alternatively, in the parallel search method, a plurality of serial acquisition circuits simultaneously perform the acquisition operation, thereby reducing the time required for acquisition. The conventional parallel search scheme includes a plurality of the serial acquisition circuits shown in FIG. 1, arranged in parallel. Accordingly, the conventional parallel search scheme requires a plurality of controllers, or control procedures, in order to perform the required comparisons and determinations on the detection energies output from the required plurality of correlators. As a result, the conventional parallel search scheme includes an increased number of controllers and requires a complicated control operation for the detection energies. For example, the controller must examine whether any one of the detection energies are greater than the threshold value, out of the detection energies from the several correlators. To this end, the controller must first determine the detection energy having the highest energy value out of the detection energies to compare it with the threshold value, or must compare all the detection energies with the threshold value, thereby resulting in a complicated control operation.

CDMA mobile communication systems have developed from the IS-95 standard, which mainly provides voice service, into the IMT-2000 standard, which provides high-speed data service as well as voice service. The IMT-2000 standard aims at high-quality voice service, moving picture service, and Internet search service. In addition, as a test system for the IMT-2000 standard, a multicarrier system which transmits an information signal by distributing the information signal to a plurality of carriers is proposed. That is, the multicarrier system modulates the information signal, which has undergone direct sequence spreading with the same PN sequence, with different carriers and transmits the modulated information signals.

A base station for the multicarrier CDMA system converts an information signal into a plurality of parallel signals and multiplies the converted parallel signals by a PN sequence to spread the signals. The base station modulates the spread signals by multiplying the spread signals by the different carriers.

A PN sequence acquisition circuit for the multicarrier CDMA mobile communication system can be implemented using either the serial search scheme or the parallel search scheme. The acquisition circuit using the serial search scheme searches a single carrier receiving signal out of a plurality of carrier receiving signals. Alternatively, the acquisition circuit using the parallel search scheme simultaneously searches all the carrier receiving signals transmitted from the transmitter. The acquisition circuit having the serial search scheme is advantageous in that the hardware structure is greatly simplified. However, the acquisition circuit having the serial search scheme has a low acquisition speed for the local PN sequence. Further, when the carrier receiving signals undergoes frequency selectivity fading, the acquisition circuit may fail to perform acquisition even though the BS generated PN sequence is in sync with the local PN sequence. That is, even though the BS generated PN sequence is in sync with the local PN sequence, the acquisition circuit having the serial search scheme receives a carrier receiving signal having a poor frequency fading property transmitted from the base station, and thus fails to perform acquisition.

SUMMARY OF THE INVENTION

It is, therefore, an object of the present invention to provide a PN sequence acquisition device and method employing a parallel search scheme in a multicarrier CDMA mobile communication system.

It is another object of the present invention to provide a PN sequence acquisition device and method having a simple control scheme by combining detection energies from a plurality of correlators and comparing the combined detection energy with a threshold value, in a multicarrier CDMA mobile communication system.

It is still another object of the present invention to provide a PN sequence acquisition device and method for combining, when PN sequence acquisition is simultaneously performed on M carrier receiving signals with n ($1 \leq n \leq N$, where n and N are natural numbers and N is the number of acquisition circuits) time hypotheses, detection energies corresponding to a local PN sequence of an nth time hypothesis for the M carrier receiving signals and simply comparing the combined energy with a threshold value to determine the combined energy, in a multicarrier CDMA mobile communication system.

In accordance with one aspect of the present invention, a PN sequence acquisition device in a multicarrier CDMA mobile communication system comprises M (where M is a natural number) despreaders, each for multiplying base station (BS) generated PN sequences, included in a corresponding one of M carrier receiving signals, by a local PN sequence in a predetermined integrating period; M correlators each corresponding to a corresponding one of the M despreaders, and each for calculating detection energies depending on correlations between the BS generated PN sequences included in the M carrier receiving signals and the local PN sequence; a combiner for combining the detection energies corresponding to a local PN sequence of an nth time hypothesis for the M carrier receiving signals; a controller for comparing the combined detection energy of the M carrier receiving signals, output from the combiner, with a threshold value; and a local PN generator for providing the local PN sequence to the M despreaders and for shifting a phase of the local PN sequence under the control of the controller.

In accordance with another aspect of the present invention, a PN sequence acquisition device in a multicarrier CDMA mobile communication system comprises M (where M is a natural number) despreaders, each for multiplying BS generated PN sequences included in M carrier receiving signals by a local PN sequence of an nth ($1 \leq n \leq N$, where n and N are natural numbers) time hypothesis in a predetermined integrating period; M correlators, each corresponding to a corresponding one of the M despreaders and each for calculating detection energies depending on correlations between the BS generated PN sequences of the corresponding one of M carrier receiving signals and the local PN sequence of the nth time hypothesis; a combiner for combining the detection energies corresponding to the local PN sequence of the nth time hypothesis for the M carrier receiving carriers; a controller for comparing the combined detection energy of the M carrier receiving signals, output from the combiner, with a threshold value; and N acquisition circuits including an nth local PN generator for providing the local PN sequence of the nth time hypothesis to the M despreaders and shifting a phase of the local PN sequence of the nth time hypothesis by a predetermined value under the control of the controller, whereby PN sequence acquisition is simultaneously performed on N time hypotheses.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail to avoid obscuring the invention in unnecessary detail.

Figure 1:
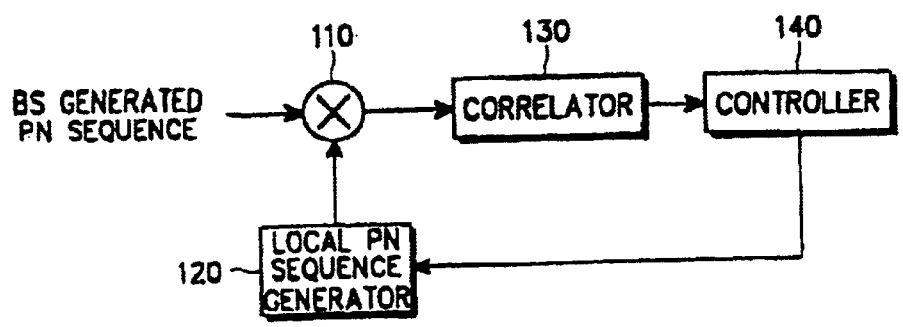
FIG. 1 is a block diagram illustrating a serial acquisition circuit for a mobile station in a conventional CDMA mobile communication system.
Figure 2:
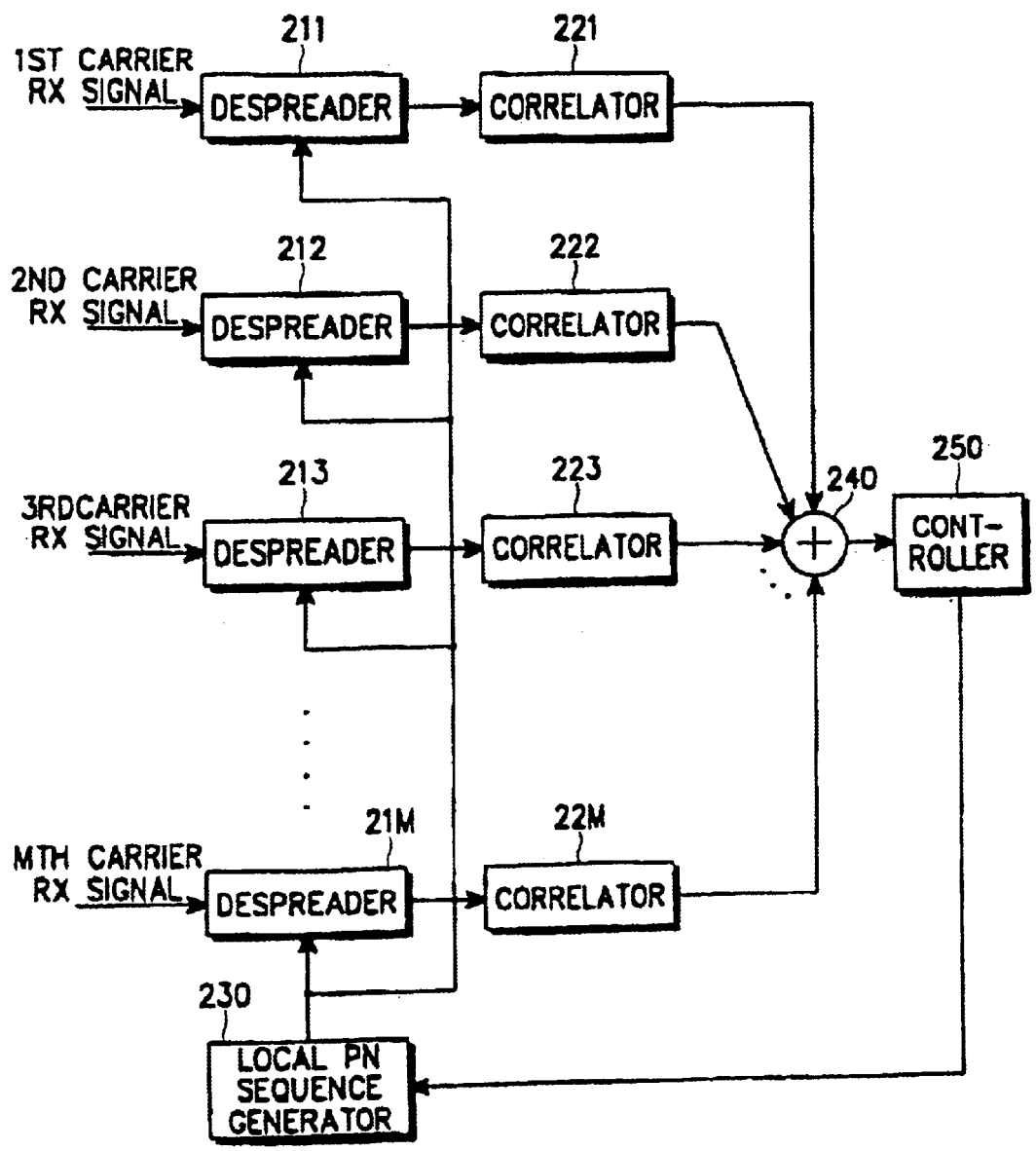
FIG. 2 is a block diagram illustrating a PN sequence acquisition circuit employing a serial search scheme according to an embodiment of the present invention in a multicarrier CDMA mobile communication system.

Turning again to the drawings, FIG. 2 illustrates a PN sequence acquisition circuit employing a parallel search scheme according to an embodiment of the present invention in a multicarrier CDMA mobile communication system.

Referring to FIG. 2, despreaders 211 to 21M multiply BS generated PN sequences included in first to Mth carrier receiving signals by a local PN sequence generated from a local PN sequence generator 230, respectively. Correlators 221 to 22M calculate detection energies depending on correlations between the BS generated PN sequences included in the carrier receiving signals and the locally generated PN sequence. A combiner 240 combines the calculated detection energies. A controller 250 compares the combined detection energy with a threshold value. When the combined detection energy is greater than the threshold, the controller 250 determines that a starting point of the present local PN sequence falls within a critical error range. Otherwise, when the combined detection energy is less than the threshold value, the controller 250 controls the local PN sequence generator 230 to shift a phase of the local PN sequence by a set unit value, and thereafter, the sequence is repeated.

However, as shown in FIG. 2, the combiner 240 combines the detection energies output from the correlators 221–22M.

The controller 250 then compares the combined detection energy with the threshold value to determine acquisition success or acquisition failure. If the combined energy is larger than the threshold, the controller 250 determines there is acquisition success and begins a verify mode. Otherwise, the controller 250 determines a hypothesis and performs next hypothesis testing. Using this approach, the controller's 250 operation is simplified.

Figure 3:
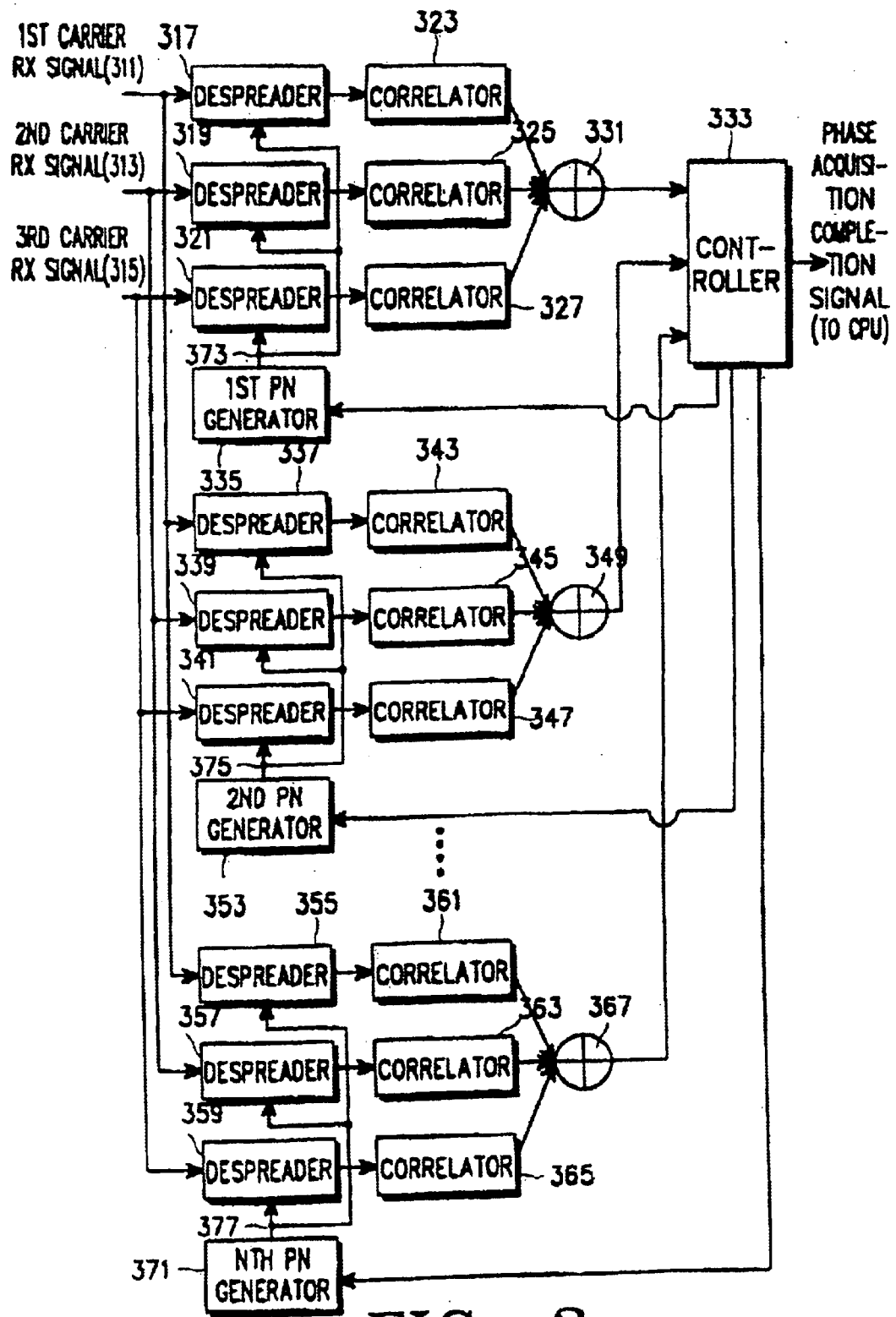
FIG. 3 is a block diagram illustrating a PN sequence acquisition circuit employing a parallel search scheme according to another embodiment of the present invention in a multicarrier CDMA mobile communication system.

FIG. 3 illustrates a PN sequence acquisition circuit employing a parallel search scheme in the multicarrier CDMA mobile communication system according to another embodiment of the present invention.

In an exemplary embodiment of FIG. 3, it is assumed that three carriers are used. Referring to FIG. 3, each PN sequence acquisition circuit includes three parallel acquisition circuits, one for each carrier, and overall there are N serial acquisition circuits.

Operation of the parallel acquisition circuits according to the carriers will be described below. A first carrier receiving signal 311 is despread with first to Nth local PN sequences 373, 375 and 377 generated respectively from first to Nth PN generators 335, 353 and 371, each of the local PN sequences having a different time hypothesis. The time hypothesis is defined as the timing difference between the local PN sequence and the BS generated PN sequence. In a parallel acquisition circuit, each of the local PN sequences have different timing. Despreaders 317, 337 and 355 in the parallel acquisition circuit despread the first carrier receiving signal 311 by multiplying the first carrier receiving signal 311 by the first to Nth local PN sequences 373, 375 and 377, respectively. Correlators 323, 343 and 361 associated with the despreaders 317, 337 and 355, respectively, calculate detection energies depending on the correlations between the BS generated PN sequence included in the first carrier receiving signal 311 and the first to Nth local PN sequences 373, 375 and 377, each having a different time hypothesis.

Similarly, a second carrier receiving signal 313 is despread with the first to Nth local PN sequences 373, 375 and 377 generated respectively from the first to Nth PN generators 335, 353 and 371, each of the local PN sequences having a different time hypothesis. That is, despreaders 319, 339 and 357 in the parallel acquisition circuit despread the second carrier receiving signal 313 by multiplying the second carrier receiving signal 313 by the first to Nth local PN sequences 373, 375 and 377, respectively. Correlators 325, 345 and 363 associated with the despreaders 319, 339 and 357, respectively, calculate detection energies depending on the correlations between the BS generated PN sequence included in the second carrier receiving signal 313 and the first to Nth local PN sequences 373, 375 and 377, each having a different time hypothesis.

Also similarly, a third carrier receiving signal 315 is despread with the first to Nth local PN sequences 373, 375 and 377 generated respectively from the first to Nth PN generators 335, 353 and 371, each of the local PN sequences having a different time hypothesis. That is, despreaders 321, 341 and 359 in the parallel acquisition circuit despread the third carrier receiving signal 315 by multiplying the third carrier receiving signal 315 by the first to Nth local PN sequences 373, 375 and 377, respectively. Correlators 327, 347 and 365 associated with the despreaders 321, 341 and 359, respectively, calculate detection energies depending on the correlations between the BS generated PN sequence included in the third carrier receiving signal 315 and the first to Nth local PN sequences 373, 375 and 377, each having a different time hypothesis.

Combiners 331, 349 and 367 combine detection energies for the local PN sequences having the same time hypothesis out of the detection energies for the first to third carrier receiving signals 311, 313 and 315, respectively. The combiner 331 associated with the first PN generator 335 combines the detection energies for the first local PN sequence 373 output from the first PN generator 335 for the first to third carriers signals 311, 313 and 315, i.e., the detection energies output from the correlators 323, 325 and 327, respectively. Similarly, the combiner 349 associated with the second PN generator 353 combines the detection energies for the second local PN sequence 375 output from the second PN generator 353 for the first to third carriers signals 311, 313 and 315, i.e., the detection energies output from the correlators 343, 345 and 347, respectively. Also similarly, the combiner 367 associated with the Nth PN generator 371 combines the detection energies for the Nth PN sequence 377 output from the Nth PN generator 371 for the first to third carriers signals 311, 313 and 315, i.e., the detection energies output from the correlators 361, 363 and 365, respectively. Accordingly, the detection energies for the respective carrier receiving signals, having the same time hypothesis (i.e., the detection energies output from the correlators for the carriers having the same time hypothesis) are combined into one detection signal, thereby simplifying comparison with the threshold value.

Controller 333 compares the single detection energies for the carrier receiving signals from combiners 331, 349 and 367, combined for the same time hypothesis, with associated threshold values. The controller 333 selects the largest single detection energy among the combined single detection energies from combiners 331, 349 and 367 and compares the largest single detection energy with the associated threshold value. According to the present invention, the purpose of selecting the largest single detection energy among a plurality of the single detection energies is to select the best energy value received from a certain base station. Meanwhile, controller 333 performs its operation according to the results determined in comparing the selected single detection energies with the threshold value. When the selected single detection energy is larger than the threshold value, controller 333 determines that a phase of the local PN sequence from the PN generator corresponding to the selected single detection energy and a phase of the PN sequence for respective carrier receiving signals having the same time hypothesis fall within a predetermined critical error range. If the controller determines they fall within the critical error range, the controller 333 transmits an acquisition completion signal to an upper processor (e.g., a CPU of the mobile station). Otherwise, when the selected single detection energy is less than the threshold value, the controller 333 controls the PN generator for the selected single detection energy to shift a phase of the corresponding local PN sequence by a unit value. Accordingly, the associated despreaders for the PN sequence generators despread the carrier receiving signals by multiplying the carrier receiving signals 311, 313 and 315 by the phase-shifted local PN sequence, respectively.

In the meantime, referring to FIG. 3, the PN sequence acquisition circuit comprises a plurality of PN generators for generating the first local PN sequence(373), the second local PN sequence(375), . . . and the Nth local PN sequence(377), respectively. However, according to another embodiment of the present invention, the PN sequence acquisition circuit may comprise only one PN generator for generating a PN local sequence and a plurality of delaying units for delaying the PN local sequence generated from the PN generator by different values and outputting a plurality of delayed PN sequences. Accordingly, the PN sequence acquisition circuit uses the PN local sequence generated by the PN generator and the local PN sequences outputted from the plurality of the delaying units as the first PN sequence to the Nth PN sequence, respectively. That is, with the above delaying units, it is possible to generate local PN sequences each having different time hypothesis by using only one local PN sequence. Therefore, in an alternative embodiment, the local PN sequence and the delayed local PN sequences may optionally be defined to associate with the first local PN sequence to the Nth local PN sequence.

In FIG. 3, it is noted that PN sequence acquisition is simultaneously performed on the three carrier receiving signals for N time hypotheses. Meanwhile, the reason that there are three parallel acquisition circuits is because the number of carriers is assumed to be 3 in the foregoing example. Accordingly, the number of the parallel acquisition circuits can vary according to the number of the carriers.

Table 1 below shows the experimental results of the PN sequence acquisition circuit of FIG. 3. In general, performance tests of the PN sequence acquisition circuit is performed on the basis of an average acquisition time. In the experiment, a single dwell search method was used, 3 carriers were used, and a parallel acquisition circuit was used which comprised 8 serial acquisition circuits. Further, the PN sequence has a period of 32768 chips and a chip rate of 1.2288 Mcps, and the number of hypothesis tests per chip is 2, and a penalty time is 3000 chips.

TABLE 1

| Ec/Io (dB) | Acquisition Performance According to Invention (sec) | Acquisition Performance of Acquisition Circuit Having Serial Search Scheme (sec) |
| --- | --- | --- |
| −10 | 0.31 | 0.77 |
| −12 | 0.49 | 1.22 |
| −14 | 0.81 | 1.96 |
| −16 | 1.35 | 3.24 |
| −18 | 2.35 | 5.48 |
| −20 | 4.30 | 8.32 |
| Average | 1.60 | 3.50 |

As described above, a novel PN sequence acquisition circuit for a multicarrier CDMA mobile communication system simultaneously performs an acquisition operation on a plurality of carrier receiving signals, thereby reducing an average acquisition time as compared with a case where the serial search scheme is used. The PN sequence acquisition circuit combines the detection energies from a plurality of correlators, and a controller compares the combined detection energy with a threshold value, thereby simplifying the acquisition operation.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A PN (Pseudo Noise) sequence acquisition device in a multicarrier CDMA (Code Division Multiple Access) mobile communication system, the device comprising:

M (where M is a natural number) despreaders, each for multiplying base station (BS) generated PN sequences, included in a corresponding one of M carrier receiving signals, by a local PN sequence in a predetermined integrating period;

M correlators, each corresponding to a corresponding one of the M despreaders, and each for calculating detection energies depending on correlations between the BS generated PN sequences included in the corresponding one of M carrier receiving signals and the local PN sequence;

a combiner for combining the detection energies corresponding to a local PN sequence for the M carrier receiving signals;

a controller for comparing the combined detection energy of the M carrier receiving signals, output from the combiner, with a threshold value; and a local PN generator for providing the local PN sequence to the M despreaders and for shifting a phase of the local PN sequence under the control of the controller.

2. The PN sequence acquisition circuit as claimed in claim 1, wherein the controller determines, when the combined detection energy is greater than the threshold value, that a phase of the BS generated PN sequence and a phase of the local PN sequence falls within a predetermined critical error range and provides an upper processor with an acquisition completion signal, or else the controller controls the local PN generator to shift a phase of the local PN sequence by a predetermined value, when the combined detection energy is less than the threshold value.

3. A PN sequence acquisition method in a multicarrier CDMA mobile communication system, comprising the steps of:

(a) multiplying BS generated PN sequences included in M (where M is a natural number) carrier receiving signals by a local PN sequence in a predetermined integrating period;

(b) calculating detection energies depending on correlations between the BS generated PN sequences included in the M carrier receiving signals and the local PN sequence;

(c) combining the calculated detection energies;

(d) comparing the combined detection energy of the M carrier receiving signals with a threshold value; and (e) shifting a phase of the local PN sequence according to the comparison results and then returning to the step (a).

4. The PN sequence acquisition method as claimed in claim 3, further comprising the step of determining, based on the comparison results of step (d), that a phase of the BS generated PN sequence and a phase of the local PN sequence falls within a predetermined critical error range and providing an upper processor with an acquisition completion signal.

5. A PN sequence acquisition device in a multicarrier CDMA mobile communication system, comprising:

M (where M is a natural number) despreaders, each for multiplying BS generated PN sequences included in M carrier receiving signals by a local PN sequence of an nth (1≦n≦N, where n and N are natural numbers) time hypothesis in a predetermined integrating period;

M correlators, each corresponding to a corresponding one of the M despreaders and each for calculating detection energies depending on correlations between the BS generated PN sequences of the corresponding one of M carrier receiving signals and the local PN sequence of the nth time hypothesis;

a combiner for combining the detection energies corresponding to the local PN sequence of the nth time hypothesis for the M carrier receiving carriers;

a controller for comparing the combined detection energy of the M carrier receiving signals, output from the combiner, with a threshold value; and N acquisition circuits including an nth local PN generator for providing the local PN sequence of the nth time hypothesis to the M despreaders and shifting a phase of the local PN sequence of the nth time hypothesis by a predetermined value under the control of the controller, whereby PN sequence acquisition is simultaneously performed on N time hypotheses.

6. The PN sequence acquisition device as claimed in claim 5, wherein the controller determines, when the combined detection energy is greater than the threshold value, that a phase of the BS generated PN sequence and a phase of the local PN sequence of the nth time hypothesis falls within a predetermined critical error range and provides an upper processor with an acquisition completion signal, or else the controller controls the local PN generator for the nth time hypothesis to shift a phase of the local PN sequence of the nth time hypothesis by a predetermined value, when the combined detection energy is less than the threshold value.

7. A PN sequence acquisition method in a multicarrier CDMA mobile communication system, comprising the steps of:

multiplying BS generated PN sequences included in M (where M is a natural number) carrier receiving signals by a local PN sequence of an nth ($1 \leq n \leq N$, where n and N are natural numbers) time hypothesis in a predetermined integrating period;

calculating detection energies depending on correlations between the BS generated PN sequences of the M carrier receiving signals and the local PN sequence of the nth time hypothesis;

combining the calculated detection energies; corresponding to the local PN sequence of the nth time hypothesis for the M carrier receiving carriers;

comparing the combined detection energy for the M carrier receiving signals with a threshold value; and shifting a phase of the local PN sequence of the nth time hypothesis by a predetermined value according to the comparison results and then returning to the multiplying step, whereby PN sequence acquisition is simultaneously performed on N time hypotheses.

8. The PN sequence acquisition method as claimed in claim 7, further comprising the step of determining, based on the combined detection energy comparison results, that a phase of the BS generated PN sequence and a phase of the local PN sequence of the nth time hypothesis falls within a predetermined critical error range and providing an upper processor with an acquisition completion signal.

* * * * *